ary patent office 2,731,388
Patented Jan. 17, 1956

2,731,388

RECOVERY AND PURIFICATION WITH ORGANIC SOLVENT OXIMES OF SUBSTANCES HAVING VITAMIN B$_{12}$ ACTIVITY

Jerry Robert D. McCormick, New City, N. Y., and Siegfried A. Muller, Westwood, N. J., assignors to American Cyanamid Company, New York, N. Y., a corporation of Maine No Drawing. Application November 7, 1951,
Serial No. 255,322

12 Claims. (Cl. 167—81)

This invention relates to the recovery and purification of substances having vitamin activity from mixtures containing the same and, more particularly, to the recovery of substances having vitamin B12 activity.

Vitamin B12 has been recently isolated from natural sources and found to be extremely useful in the treatment of certain types of anemia. Following the isolation of vitamin B12, several other compounds have been isolated from natural sources which are quite similar to vitamin B12 in biological activity. For example, vitamin B12b has biological activity substantially identical to that of vitamin B12. The chemical structure of any of the substances having vitamin B12 activity has not been accurately determined; however, all are believed to be quite similar in chemical nature and are characterized as cobalt coordination complexes. In fact, vitamin B12b is reported to differ from vitamin B12 only by having an hydroxyl group instead of a cyano group in coordination with the cobalt atom. Conjugate of the above cobalt coordination complexes with naturally occurring materials, such as proteins, may also possess vitamin B12 activity. In this specification and claims, all such substances are referred to simply as materials having vitamin B12 activity.

There are many natural sources from which it is possible to extract materials having vitamin B12 activity. For instance, such materials may be isolated from the animal liver and from the feces of various animals. However, at the present time, the most suitable source of materials having vitamin B12 activity is fermentation media which has supported the growth of various microorganisms. Many microorganisms, when grown on fermentation media, produce small quantities of vitamin B12 material. Such microorganisms may be illustrated by *Aerobacter aerogenes* and *Streptomyces olivaceus*. Other well known microorganisms produce minute quantities of materials having vitamin B12 activity along with other beneficial materials. For instance, *Streptomyces aureofaciens*, which produces chlortetracycline and is fermented for this purpose, also produces small quantities of materials having vitamin B12 activity. *Streptomyces griseus*, which produces streptomycin, produces small quantities of material having vitamin B12 activity when grown on fermentation media. Many other microorganisms, including various bacteria and fungi are known by those skilled in the art to produce materials having vitamin B12 activity. Illustrative examples are *Clostridium butyricum*, *Bacillus megatherium*, *Eremothecium ashybii* and *Flavobacterium solare* and *Streptomyces rimosus*. Since, however, these microorganisms produce vitamin B12 materials in only very small quantities, the problem of recovering these materials from fermentation media is extremely involved and difficult.

Two general methods have been employed for recovering materials having vitamin B12 activity. The first method comprises adsorbing the vitamin material upon an adsorbent substance, such as charcoal, and thereafter recovering the same by elution. The second method commonly employed comprises extraction of a source of the vitamin material with an organic solvent. Both methods have their advantages and disadvantages. One of the disadvantages of the extraction procedure has been the lack of a suitable organic solvent having a high specificity for the vitamin material and, when an aqueous solution is to be extracted by liquid-liquid extraction, a high distribution coefficient with respect to water for the vitamin material. By high specificity for vitamin B12 material it is meant that the solvent has relatively high solvent power for the vitamin material but a low solvent power for the impurities or other materials usually associated with the vitamin material. By high distribution coefficient with respect to water it is meant that when the organic solvent is in equilibrium with an aqueous phase containing vitamin B12, the concentration of the vitamin material in the organic solvent is high relative to the concentration of the vitamin material in the aqueous phase. The new process of this invention is concerned with an extraction procedure in which a new solvent, having such a high specificity and distribution coefficient with respect to water, is employed.

According to the process of this invention, a source of materials having vitamin B12 activity is brought into contact with an organic solvent comprising an oxime and the vitamin material is subsequently recovered from the oxime solvent. Oximes which are suitable for the process of this invention may be represented by the following general formula:

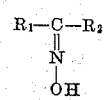

in which R$_1$ represents a member selected from the group consisting of hydrogen, alkyl radicals and lower alkanoyl radicals, and in which R$_2$ represents a radical selected from the group consisting of aryl and lower alkanoyl. Of course, not all oximes of the above formula have an equally high specificity and distribution coefficient for materials having vitamin B12 activity, and for this reason some oximes may be more advantageously employed than others. Also, in selecting an organic solvent, an oxime should be chosen which is a liquid or which becomes a liquid at a temperature less than 100° C. in the presence of water. Other factors which should be considered in choosing a solvent include the availability or relative ease of preparation of the oxime.

Oximes of the above formula are known compounds and can be prepared by methods well known in the art. For instance the aldoximes may be prepared by reacting the appropriate aldehyde with hydroxylamine. The ketoximes may be prepared by reacting the appropriate ketone with hydroxylamine or by reacting a methylene ketone with nitrous acid or an organic nitrite. The oxime solvents have the advantage of having an exceptionally high specificity for materials having vitamin B12 activity and therefore by their use the vitamin material may be obtained in relatively pure form with a minimum of difficulty. In addition to the above advantage the oxime solvents also have a high distribution coefficient with respect to water for vitamin B12 material so that a minimum amount of solvent need be employed in liquid-liquid extractions and small extractions may readily be performed. The oxime solvents have none of the corrosive and objectionable properties of many of the solvents now employed such as the phenols and may be employed without danger of injury to apparatus and workmen.

As a result of the above advantages, the process of the present invention can be carried out with higher yields and lower cost in a shorter time than previously known processes. It accomplishes a large degree of purification in a minimum of steps. The new process is also characterized by its ease of mechanical operation, making expensive equipment unnecessary. Other advantages will be apparent to those skilled in the art.

The new method of this invention may be employed in practically any extraction system. For instance, in liquid-liquid extraction, one may employ countercurrent extraction, cocurrent extraction, or batch extraction. The extraction may be performed in any of the well known types of extraction apparatus, such as baffle towers, packed towers, horizontal troughs, etc. Of course, the most advantageous procedure is one which obtains the most intimate contact of the two solutions. Other factors which should be considered in liquid-liquid extraction are the volume of solution to be extracted and the degree of separation desired. If solid-liquid extraction is employed, the most advantageous procedure comprises simply dispersing the source of vitamin material in the liquid oxime which dissolves the material having vitamin activity but leaves the impurities in suspension. Of course, other procedures of solid-liquid extraction may also be employed.

Practically any source of vitamin B12 material may be employed in the process of this invention. As previously mentioned, an excellent source of vitamin B12 material is a fermentation medium resulting from the growth of certain microorganisms. In solid-liquid extraction, the solids may be recovered from such a fermentation medium and thereafter extracted with a selected oxime solvent. If the medium from such a fermentation contains antibiotics, these may or may not be removed prior to the extraction. Likewise, the microorganisms, for instance bacteria or fungi, may or may not be removed before extraction. In liquid-liquid extraction, the aqueous liquid to be treated may be a fermentation medium or it may be a concentrated solution of vitamin B12 material obtained by other purification procedures. The aqueous solution of vitamin material may be a very concentrated solution, even a saturated solution although as a general rule concentrations below about 50 gammas of B12 activity per milliliter are preferred. Likewise, the solution of vitamin material may be a very dilute solution. Aqueous solutions in which the concentration of vitamin material is as low as 0.01 gamma of vitamin B12 activity per milliliter may be employed although solutions having a concentration above about 0.05 gamma of vitamin B12 activity per milliliter are usually advantageous. The aqueous solution to be treated may have been given previous chemical or physical treatments for various purposes, such as to remove antibiotics, to increase the amount of vitamin B12 material or to break up vitamin-protein conjugates. In other words, the new process of this invention may be employed to separate vitamin B12 material from any mixture containing the same which is usually encountered in vitamin B12 purification.

As mentioned above, certain classes of the oximes encompassed by the general formula above have properties which make them more suitable than others for the new process of this invention. One such class of oximes are the arylaldehyde oximes represented by the following formula:

$$H-\underset{\underset{OH}{\overset{\|}{N}}}{C}-R_3$$

in which $R_3$ is a phenyl or substituted phenyl radical. Suitable groups with which the phenyl radical may be substituted may be illustrated by the following: lower alkyl, hydroxy, lower alkoxy, halogen and nitro groups. This class of oximes can conveniently be prepared by reacting benzaldehyde or the appropriate ring substituted derivative thereof with hydroxyl amine.

A second class of oximes which has been found to be especially suitable are those represented by the formula:

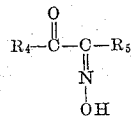

in which $R_4$ and $R_5$ represent lower alkyl groups having less than 5 carbon atoms, for instance methyl, ethyl and propyl. Oximes of this class having a total number of carbon atoms less than 8 are advantageous and may conveniently be prepared by reacting nitrous acid with the appropriate alpha-methylene ketone.

The third class of oximes which has been found to be especially suitable are those represented by the formula:

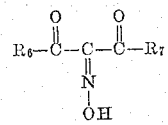

in which $R_6$ and $R_7$ represent the same or different lower alkyl groups, for instance methyl, ethyl and butyl. Oximes in which the total number of carbon atoms is less than 8 and in which $R_6$ and $R_7$ each have less than 5 carbon atoms will be found to be the most satisfactory. This class of oximes is conveniently prepared by reacting the appropriate diketone with nitrous acid.

Aldoximes of the first class above are usually relatively water immiscible and, therefore, may be employed in liquid-liquid extraction of an aqueous solution in even the smallest quantities. However, oximes of the second and third classes are sometimes water-soluble to some extent. If one of the oximes of the latter two classes is employed in liquid-liquid extraction of an aqueous solution, it must be used in excess of its solubility so that two phases are obtained or else a second organic solvent which is water-immiscible should be employed in combination with the oxime. Suitable solvents for this purpose may be illustrated by butanol and chloroform. Of course, such solvents as butanol and chloroform can be employed in combination with even the water-immiscible oximes, if desired. However, this is usually not advantageous.

It is one of the advantages of the new process of this invention that liquid-liquid extraction of an aqueous solution may be carried out at a neutral pH, or at hydrogen ion concentrations which vary widely from that of a neutral solution. Of course, care should be exercised that a pH is not employed at which the vitamin B12 material or the oxime solvent is unstable. The vitamin B12 materials are usually relatively stable at pH's as low as about 1.0 and at pH's as high as about 11.0. The aldoximes suitable for the process of this invention are relatively stable over substantially the same pH range, but the ketoximes of the type given above often show instability above a pH of about 9.0. In other words, if one is employing an aldoxime, the extraction can usually be performed at any pH at which the vitamin material is stable, but with the ketoximes a pH above about 9.0 should not be employed. As will be obvious to those skilled in the art, this operable pH range is so broad that in most instances careful pH control is unnecessary. It has, however, been found that the oximes are more specific within certain pH ranges and if one is to obtain the utmost advantage of the new process of this invention in liquid-liquid extraction of an aqueous solution, hydrogen ion concentrations within the preferred range should be employed. The preferred range for the aldoxime solvents of this invention is usually between a pH of 7.0 and 10.0, and the preferred hydrogen ion concentration for the ketoxime solvents of this invention is usually between a pH of 3.0 and 8.0.

Another advantage of the new process of this invention is that it can be carried out within a wide range of temperatures. For instance, temperatures from 0° C. up to 80° C., or even 100° C., may be employed. Of course, one must employ a temperature sufficiently high with some of the oximes having higher melting points to obtain liquid extraction. In other words, in liquid-liquid extraction, if the oxime is a solid in the presence of water at room temperature, a temperature should be employed at which the oxime is a liquid in the presence of water and in solid-liquid extraction a temperature must be employed at which the oxime is a liquid. Unless one is limited to a higher temperature by the particular oxime solvent employed, room temperature, i. e. 20° C. to 40° C., is usually preferred for reasons of convenience.

The amount of solvent employed and the time required for extraction depend upon a number of factors, as will be apparent to those skilled in the art. In solid-liquid extraction, sufficient solvent should be employed to dissolve substantially all of the vitamin B12 material. In fact, it is usually advantageous to employ a considerable excess of solvent over that necessary to dissolve the vitamin B12 material because the use of a minimum amount of solvent, due to the high solubility of vitamin B12 materials in the oxime solvents, results in the use of such a small quantity that a large percentage thereof will be lost by absorption in the insoluble materials. As a general rule, in solid-liquid extraction, a weight of solvent equal to 1 to 100 times the weight of solid to be extracted will be found to be most advantageous, depending upon the percentage of vitamin B12 contained in the solid material, the solubility of the vitamin B12 material in the particular oxime solvent and the degree of recovery desired. The time allowed for extraction also depends upon most of the above factors, but primarily upon the desired degree of recovery and the degree of contact obtained. In other words, if one forms a very fine dispersion of the solid material in the oxime solvent, a shorter time will be required for substantially complete recovery than will be required if a very coarse dispersion is formed. Since, however, prolonged contact is not detrimental, the oxime solvent may be left in contact with the solid material for as long as desired.

The amount of solvent employed and the time required for extraction in liquid-liquid extraction likewise depends upon a number of factors, as will be apparent to those skilled in the art. The primary factor determining the amount of solvent to be employed in liquid-liquid extraction is the degree of extraction of the aqueous solution desired. In other words, if one wishes to remove substantially all of the vitamin B12 material from the aqueous solution, a greater quantity of solvent will be required than if one only wishes to remove 50% of the vitamin material. Other factors which influence the quantity of oxime solvent to be employed are the distribution coefficient of the particular oximes selected, the water solubility of the oxime and the degree of contact obtained during extraction. As a general rule in liquid-liquid extraction, a volume of solvent equal to about 0.1 to 100 times the volume of aqueous solution, depending upon the above factors, will be found to be most advantageous. Of course, the minimum time required for extraction also depends upon the above factors, but is primarily determined by the degree of interfacial contact obtained.

After the desired degree of contact has been obtained, the solution of the vitamin B12 material in the oxime is separated and thereafter treated to recover the vitamin B12 material in any desired manner. The vitamin material may be recovered from the oxime solvent by solvent evaporation, in some instances, although this is usually not so advantageous because the oximes are relatively high-boiling compounds. A more satisfactory way of recovering the vitamin material comprises diluting the oxime solvent with a liquid which is soluble in the oxime, but which has practically no solvent power for the vitamin B12 material. Examples of suitable liquids for this purpose may be illustrated by the following: benzene, ether, chloroform, higher petroleum ethers, or other organic liquids of this type. After dilution with such a liquid, the vitamin B12 material may be removed by procedures such as filtration or the vitamin material may be recovered from the mixture of organic liquids by water extraction.

The preferred method of recovering the vitamin material from the oxime solvent comprises treating the oxime solution of vitamin material with an amine, according to the procedure of copending application, Serial No. 255,324, filed concurrently herewith, so that a complex is formed between the oxime and the amine, which complex has a much lower solvent power and distribution coefficient with regard to water for the vitamin B12 material than did the original oxime. Suitable amines for this purpose are given in the above copending application and include pyridine and substituted pyridines. Since the solvent power for vitamin B12 materials of the amine-oxime complex is much lower than the solvent power of the oxime, a fine precipitate of vitamin B12 material is usually obtained and this may be removed by filtration or centrifugation, if desired. However, the distribution coefficient with respect to water for the vitamin material is also much lower for the amine-oxime complex than for the oxime alone and once such a complex has been formed, the vitamin B12 material may readily be extracted therefrom with an aqueous solvent by liquid-liquid extraction. The last mentioned procedure will usually be found to be the more satisfactory of the two, since it results in a greater recovery of the vitamin material than simple filtration. Of course, a combination of the two methods can be employed, if desired.

Aqueous extraction of vitamin B12 material from an organic solvent having a low distribution coefficient with regard to water may be accomplished by any of the known procedures for liquid-liquid extraction. The amount of water to be employed obviously depends upon a number of factors, for instance the degree of interfacial contact obtained, the distribution coefficient of the organic solvent with respect to water, and the degree of recovery desired. As a general rule, a volume of water equal to 10% to 50% of the volume of organic solvent in a two- or three-stage countercurrent extraction system will be found to be satisfactory. Of course, if one is working with small volumes, satisfactory extraction can usually be obtained by simply adding water to a vessel containing the organic solution of vitamin B12 and thoroughly stirring the two liquids.

The vitamin B12 material recovered by any of the above procedures will be found to be in a vastly purer state than the starting material. This purified vitamin B12 material may be further purified for parenteral use by known procedures or it may be employed without further modification for various purposes, for instance in animal foods.

This invention will be more particularly illustrated by the following specific examples in which all parts are by weight unless otherwise indicated.

*Example I*

3 parts by volume of a crude aqueous concentrate of vitamin B12 having a dry-basis potency of 160 gammas of B12 activity per gram of total solids was extracted with an equal volume of benzaldehyde oxime. The organic layer was separated and treated with approximately 30 parts by volume of benzene. The resulting precipitate was separated and dried. The dried material was found to have a dry-basis potency of 710 gammas of B12 per gram of total solid.

*Example II*

5 parts by volume of an aqueous solution of crude vitamin B12 material assaying 21 gammas of vitamin B12 activity per ml. and having a dry-basis potency of 168 gammas of vitamin B12 per gram of total solids was extracted twice with 1 part by volume portions of benzaldehyde oxime. The combined oxime extracts were washed with 2 parts by volume of distilled water and the wash discarded. To the washed oxime extracts there was then added 2 parts by volume of water and 2 parts by volume of pyridine. The mixture was shaken and centrifuged. The separated aqueous phase assayed 41 gammas of B12 activity per ml. and had a dry-basis potency of 1,835 gammas of B12 activity per gram of total solids. In other words, a more than tenfold purification was achieved in a single purification step.

*Example III*

To 1 part by volume of an aqueous solution containing 41 gammas of vitamin B12 material per ml., there was added 0.5 part by volume of a saturated ammonium sulfate solution. The resulting mixture was gently warmed and shaken with 0.2 part by volume of molten 3-oximinopentanedione-2,4. The organic phase was separated, leaving an almost white aqueous phase, thus showing that substantially all of the vitamin B12 had been transferred to the oxime. The oxime solution of vitamin B12 material was treated with 0.2 part by volume of aldehydin (2-methyl-5-ethyl pyridine). There was then added 0.5 part by volume of water, the mixture well shaken and then centrifuged. The aqueous layer was separated and found to contain substantially all of the vitamin B12 material in a purified state.

*Example IV*

To 0.5 part by volume of a pink solution of vitamin B12 material assaying 41 gammas of B12 activity per ml., there was added 0.5 part by volume of water plus 0.5 part by volume of saturated ammonium sulfate solution and 0.1 part by volume of molten biacetyl monoxime. The mixture was gently warmed and then well shaken. The aqueous phase became colorless and the organic phase became red in color, thus showing that the vitamin B12 material had been transferred to the organic phase. To the organic phase, there was added 0.2 part by volume of aldehydin and this mixture was shaken with 1.5 parts by volume of aqueous solvent. The vitamin B12 material was thus transferred to the aqueous phase, which was separated, and the vitamin B12 material recovered.

*Example V*

A 0.5 part by volume sample of a pink colored vitamin B12 solution assaying 41 gammas per ml., was shaken with 0.5 part by volume of molten anisic aldoxime. The separated solvent phase assayed 20 gammas of B12 activity per ml. and the aqueous phase 23 gammas per ml. When the solvent extract was shaken with 0.5 part by volume of water and 5 parts by volume of benzene, substantially all the pink color entered the aqueous phase.

*Example VI*

A 0.5 part by volume portion of a pink vitamin B12 solution was shaken with 0.1 part by volume of molten salicylaldoxime. Substantially all the pink coloration entered the solvent phase, and the aqueous phase became essentially colorless. When the solvent extract was shaken with 0.1 part by volume of pyridine and 0.5 part by volume of water, the aqueous phase became pink and the organic phase was colorless.

*Example VII*

A sample of *Streptomyces olivaceous* mash was adjusted to pH 1.8 and heated to 50° C., then cooled to 30° C. and filtered. The filtrate was adjusted to pH 9.2 and filtered. A 300 ml. portion of this filtrate was extracted with 5×15 ml. of benzaldoxime. To the 72 ml. of oxime extract assaying 2.5 gammas of B12 activity per ml., there was added an equal volume of aldehydin (2-methyl, 5-ethyl pyridine), and the organic phase was extracted with 4×10 ml. of water. The recovered aqueous phase, 39 ml., assayed 5.4 gammas of B12 activity per ml.

We claim:
1. A method of purifying materials having vitamin B12 activity which comprises extracting a source of said material with a solvent comprising an oxime of the group consisting of those represented by the formula:

in which R is a phenyl radical, separating the oxime solution of vitamin B12 material from the source material and recovering the vitamin material from said oxime solvent.

2. The method of claim 1 wherein the source of vitamin B12 material comprises an aqueous solution containing materials having vitamin B12 activity.

3. A method of purifying vitamin B12 material which comprises bringing into interfacial contact an aqueous solution containing materials having vitamin B12 activity and an organic liquid of the group consisting of oximes represented by the formula:

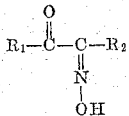

in which $R_1$ and $R_2$ represent lower alkyl groups, separating the oxime solution of vitamin B12 material from the aqueous solution and recovering the vitamin material from said oxime solution.

4. A method of purifying vitamin B12 material which comprises bringing into interfacial contact an aqueous solution containing materials having vitamin B12 activity and an organic liquid of the group consisting of oximes represented by the formula:

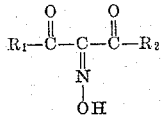

in which $R_1$ and $R_2$ represent lower alkyl groups, separating the oxime solution of vitamin B12 material from the aqueous solution and recovering the vitamin material from said oxime solution.

5. A method of purifying materials having vitamin B12 activity which comprises extracting a source of said material with a solvent comprising an oxime which is a liquid at a temperature below about 100° C. in the presence of water and being a member of the group consisting of those represented by the formula:

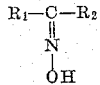

in which $R_1$ represents a member selected from the group consisting of hydrogen, lower alkyl, and lower alkanoyl radicals, and in which $R_2$ represents a radical selected from the group consisting of phenyl, lower alkyl, and the lower alkanoyl radicals, separating the oxime solution of vitamin B12 material from the source material, and recovering the vitamin material from said oxime solvent.

6. A method which comprises bringing into interfacial contact at a temperature of 0° C. to 80° C. an aqueous solution containing material having vitamin B12 activity, said solution having a pH between about pH 0.5 and pH 11.0 and containing 0.05 to 50 gammas of vitamin B12 activity per ml., with an organic liquid of the group consisting of oximes represented by the formula:

in which $R_1$ represents a member selected from the group consisting of hydrogen, lower alkyl, and lower alkanoyl radicals, and in which $R_2$ represents a radical selected from the group consisting of phenyl, lower alkyl, and lower alkanoyl radicals, separating the oxime phase, and recovering the vitamin B12 material from said oxime.

7. The method of claim 6 wherein said aqueous solution containing material having vitamin B12 activity comprises a chlortetracycline fermentation liquor.

8. The method of claim 6 wherein said organic liquid is benzaldehyde oxime.

9. The method of claim 6 wherein said organic liquid is anisic aldoxime.

10. The method of claim 6 wherein said organic liquid is salicylaldoxime.

11. The method of claim 6 wherein said organic liquid is 3-oximinopentanedione-2,4.

12. The method of claim 6 wherein said organic liquid is biacetyl monoxime.

References Cited in the file of this patent

UNITED STATES PATENTS

| | | |
|---|---|---|
| 2,530,416 | Wolf | Nov. 21, 1950 |
| 2,563,794 | Rickes | Aug. 7, 1951 |

OTHER REFERENCES

Fantes: Proceedings of the Royal Society (1950), pp. 592 to 598.